(No Model.) 2 Sheets—Sheet 1.
E. E. HOLLISTER.
FEED REGULATING AND MEASURING APPARATUS.
No. 564,929. Patented July 28, 1896.
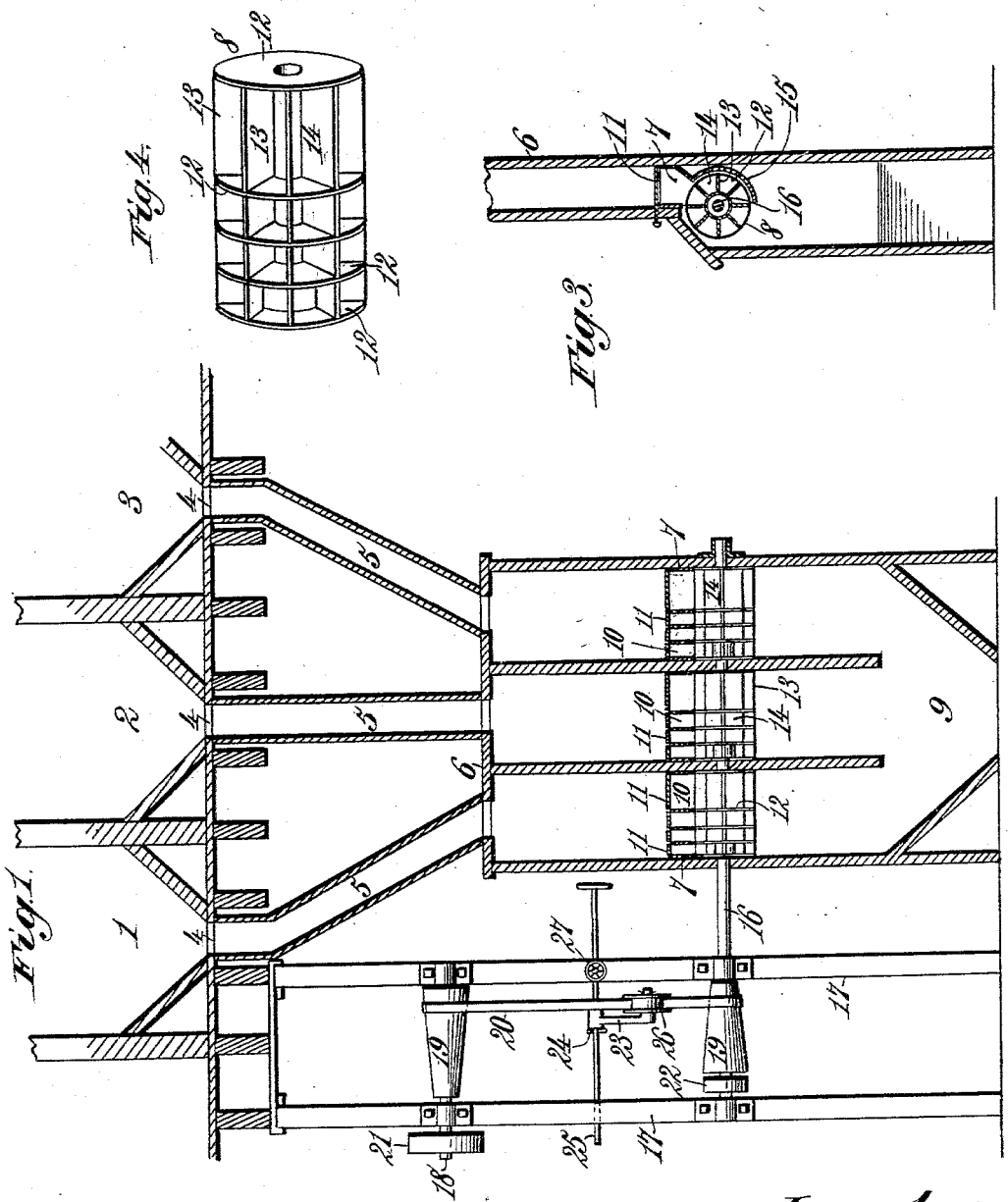
Witnesses.
Robert Everett
Thos. A. Snow
Inventor:
Edward E. Hollister.
By James L. Norris.
Atty.

(No Model.) 2 Sheets—Sheet 2.
E. E. HOLLISTER.
FEED REGULATING AND MEASURING APPARATUS.
No. 564,929. Patented July 28, 1896.
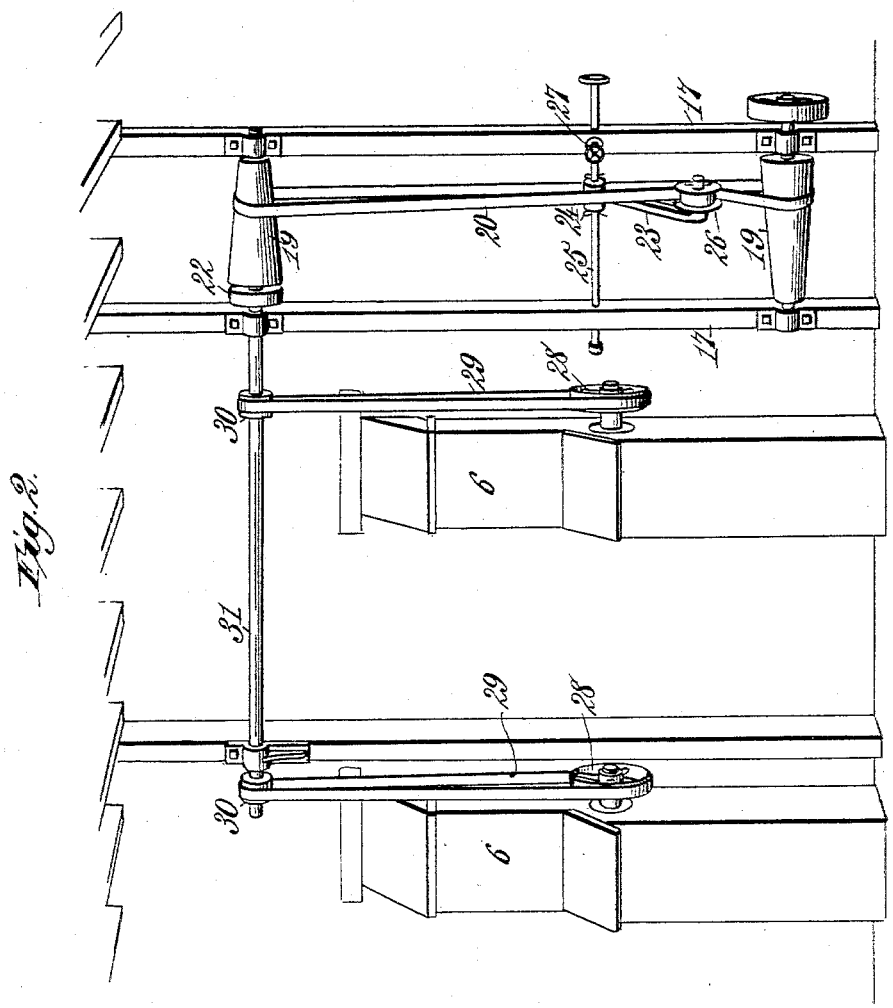
Witnesses.
Robert Everett,
Thos. A. Green
Inventor
Edward E. Hollister.
By
James L. Norris.
Atty.

UNITED STATES PATENT OFFICE.

EDWARD EVERETT HOLLISTER, OF QUINCY, ILLINOIS.

FEED REGULATING AND MEASURING APPARATUS.

SPECIFICATION forming part of Letters Patent No. 564,929, dated July 28, 1896.

Application filed September 11, 1895. Serial No. 562,185. (No model.)

*To all whom it may concern:*

Be it known that I, EDWARD EVERETT HOLLISTER, a citizen of the United States, residing at Quincy, in the county of Adams and State of Illinois, have invented new and useful Improvements in Feed Regulating and Measuring Apparatus, of which the following is a specification.

My invention relates to a feed regulating and measuring apparatus for handling grain and other material, and has for its object an accurate measurement and regulation of the feed of separate streams or volumes of material permitted to escape by gravitation from an elevated bin or bins.

The special purpose of my invention is to provide simple and reliable means for effecting an accurate mixture or compounding of several different grades of material in definitely-measured proportions without depending on the skill, experience, or judgment of an attendant.

The invention consists in the features of construction and novel combinations of devices in apparatus for measuring and regulating the feed of grain or other material and for mixing and compounding different grades in definite proportions, as hereinafter more particularly set forth.

In the annexed drawings, illustrating the invention, Figure 1 is a sectional elevation of a feed regulating, measuring, and mixing apparatus embodying my invention and shown as adapted to the simultaneous handling of three different grades of material. Fig. 2 is a perspective of a similar apparatus shown as adapted to the handling of two or more grades of material and illustrating a modification in the application of power. Fig. 3 is a vertical transverse section of one of the sectional chutes and sectional feed-wheels and their inclosing casing. Fig. 4 is a perspective of a sectional feed-wheel detached.

In carrying my invention into practice a series of elevated bins, as 1, 2, and 3, Fig. 1, are employed to contain the grain or other material to be measured, different grades of which may be accurately combined or mixed in certain definite proportions by means of the sectional measuring devices to be presently explained. To facilitate feeding the grain by gravity, the bins or hoppers 1 2 3, of which there may be any desired number, are arranged on the upper floor of a building and preferably provided in the lower part with inclined sides or surfaces leading to exit-openings 4, through which the grain or other material will escape freely. As shown in Fig. 1, the bin-exits 4 communicate with spouts 5, which may be inclined in any required direction in order to lead the material to a casing or casings 6, in which the measuring and feed-regulating devices are located.

The feed regulating and measuring apparatus is placed on a floor below the bins or hoppers and comprises an upright casing or series of casings 6, a sectional chute 7 at the bottom of the upper contracted portion of each casing, and a rotary sectional measuring and feed-regulating wheel or cylinder 8 in immediate communication with the bottom of the chute and occupying the upper end of an enlarged lower portion of the casing. At its upper end each casing 6 receives grain or other material from one of the bin-spouts 5, and the lower end of said casing delivers the measured material in definitely-regulated quantities to a mixing hopper or receptacle 9, Fig. 1, which may be located on the same floor with the measuring and feed-regulating apparatus or in a lower story of a building. This mixing hopper 9 may be arranged to connect with two or more independent casings 6 of the measuring apparatus, each receiving grain or other material of a different grade, quality, or kind from that supplied to the others. It is thus apparent that a mixture of materials in any required proportions can be readily obtained. From the hopper 9 the mixed material may be conveyed by any suitable or convenient means to a milling apparatus or cleaning apparatus (not shown) or be otherwise disposed of, as required.

In Figs. 1, 3, and 4 is shown a rotary measuring and feed-regulating wheel 8, adapted to effect, in conjunction with the sectional chute 7, a definite and accurately-controlled proportioning of the materials to be measured and mixed. Each chute 7 is divided by suitable partitions into a number of sections or compartments 10, which are of definite area, but may vary in capacity. The chute-sections 10 are adapted to be closed at the top by means of slides 11, and are open at the bottom, where they communicate with the sections or compartments of the rotary measuring and feed-regulating wheel 8, which is immediately below the chute. The wheel 8 is closed at both ends or sides and open on its periphery. On the wheel-hub are secured a series of disks 12, corresponding with the partitions of the chute 7 and dividing the wheel into annular sections, which are in turn divided by radial wings or blades 13, arranged parallel with the wheel-axis. The disks 12 and blades 13 thus divide the wheel 8 into a number of segmental pockets or compartments 14, arranged in parallel annular series. If desired, the chute 7 may be provided at the bottom with a concaved apron 15, close to a portion of the wheel-periphery, to prevent the escape of grain or other material from one annular series of wheel-compartments 14 to an adjoining annular series.

The slides 11 at the tops of the chute-compartments 10 afford means for shutting off or controlling the supply of grain to any or all of said chute-compartments and to the compartments 14 in the accompanying measuring and feed-regulating wheel. It will be obvious that by a proper adjustment of the slides in the several chutes any required proportion of grain or other material can be allowed to pass through either of the measuring and feed-regulating wheels. By this apparatus, therefore, the required proportions in a mixture of two or more grades of materials can be accurately gaged, and as the compartments in the chutes and feed-wheels are of definite predetermined capacity it is not necessary to depend on the judgment or experience of the operator. The wings or blades 13, of which there may be eight, more or less, in each wheel, will prevent the material from running through the chutes in a stream, and thus by properly varying or controlling the speed at which the wheels are rotated the feed of material can be regulated as required.

The several measuring and feed-regulating wheels 8 may be mounted on a common rotary shaft 16, as shown in Fig. 1, or on separate shafts journaled in the adjacent but separated casings 6, as shown in Fig. 2. Each casing is provided with suitable journal-bearings for the wheel shaft or shafts.

The shaft 16 is preferably extended at one end, as shown in Fig. 1, and journaled in a frame 17, in which a driving-shaft 18 is also journaled. Mounted in this frame 17, on the shafts 16 and 18, respectively, are cone-pulleys 19, connected by a belt 20 for transmitting power from the driving-shaft 18 to the shaft 16, on which the feed-wheels 8 are mounted. The driving-shaft 18 is provided with a pulley or gear 21, through which power is applied, and one of the shafts 16 or 18 may have a loose pulley 22, onto which the belt 20 can be shifted for the purpose of stopping the machine. An arm 23 is arranged loosely between cotter-pins 24 on a longitudinally-movable rod 25, supported in the frame 17, and this arm carries a flanged pulley 26, which serves as a guide and tightener for the belt 20 and as a means for shifting it along the cone-pulleys 19 to vary the speed of the rotary measuring and feed-regulating wheels. By means of any suitable jam or lock 27 the longitudinally-movable belt-shifting rod 25 and pulley 26 may be readily secured in the position to which they may be adjusted. It will be of course obvious that any other suitable belt-shifting device may be employed, if preferred.

Where the several measuring and feed-regulating wheels 8 are mounted on separate shafts, as shown in Fig. 2, each of said shafts may have a pulley 28, connected by belt 29 to a pulley 30 on a counter-shaft or line-shaft 31, on which the loose pulley 22 and one of the cone-pulleys 19 may be mounted. Any other suitable arrangement of driving mechanism may be employed, or provision may be made for applying power directly to the shaft or shafts on which the measuring and feed-regulating wheels are mounted.

The results secured by the use of this apparatus are: positive and regular speed of the streams of material to be measured or mixed without regard to the condition of the same and the further advantage of being able to mix several grades of material in definite and accurately-adjusted proportions without depending on the judgment of an attendant as to relative volumes of the different streams. In ordinary practice it is difficult to draw a small stream of dirty grain without liability of the opening in the chute becoming clogged with sticks or straw or other foreign matter. In this apparatus all such difficulty is avoided by reason of the openings or divisions in the chutes 7 being larger than is required to draw a given amount of material, the required per cent. of the stream being governed by the dimensions of the pockets or compartments in the several annular series with which the wheel 8 is provided and by the means for controlling the speed of said wheel. There is thus no liability of clogging and the speed of the stream is governed by the speed of the feed regulating and measuring wheel. The relative proportions of the pockets or compartments in the feed-wheel may be obtained by making them of varying length or of the same length but varying depth.

The operation of the apparatus will be readily understood. Suppose it is desired to mix three grades of wheat at the rate of, say, one hundred bushels per hour. The different grades of wheat are contained in the bins 1, 2, and 3, Fig. 1, and in the spouts 5 and upper parts of the casings 6, communicating therewith. If it is desired to take fifty per cent. of one grade, forty per cent. of another, and ten per cent. of another grade, the chute slide or slides 11, controlling the compartment or compartments adapted to deliver the required quantity, will be opened in the several casings communicating with the required bins, and the other slides will remain closed. Under bin 1, for instance, may be opened the slide 11, that is adapted to deliver fifty per cent. of the required material, or, say, fifty cubic inches at each revolution of the accompanying feed-wheel. Two slides representing twenty per cent. each or forty per cent. together may be opened in the casing communicating with bin 2, so that the feed-wheel in that casing will deliver, say, forty cubic inches at each revolution. The required ten per cent. from bin 3 will be obtained in like manner by opening the slide at the left of the communicating casing below that bin, thereby enabling the feed-wheel in that casing to deliver, say, ten cubic inches at each revolution. Each feed-wheel 8 delivers its proper proportion of material to the mixing-hopper 9, hereinbefore mentioned. Any other proportions of the different materials may be obtained with great accuracy and ease by opening the proper slide or slides 11 in the several casings or sections of the apparatus. The required slides in the different chutes are to be drawn wide open, as the speed of the stream or rate of delivery is controlled by the feed-wheel, and thus there are no small openings or passages to become clogged.

The sectional feed-wheel effects an absolute regularity of feed, and in connection with the sectional chute and its slides it provides for better and more uniform work than ordinary and permits an accurate measuring of the required proportions in a mixture composed of different grades of material.

What I claim as my invention is—

1. In apparatus for measuring and regulating the feed of grain or other material, the combination with a number of elevated bins and spouts leading therefrom, of a series of casings communicating with the lower ends of said spouts and each provided with a contracted upper portion and an enlarged lower portion, a sectional chute located in the lower end of the contracted portion of each casing and each provided with a series of compartments, a series of slides at the top of each sectional chute to control the supply of material to the several chute-compartments, a sectional feed-wheel located in the top of the enlarged part of each casing immediately below and in communication with a sectional chute, each wheel being provided with several annular series of pockets or compartments of definite capacity, and a mixing-hopper with which the lower ends of the several casings communicate, substantially as described.

2. In apparatus for measuring and regulating the feed of grain or other material, the combination of a number of elevated bins, sectional chutes communicating with said bins, sectional feed-wheels located immediately below said chutes, each wheel being provided with several annular series of pockets or compartments of definite capacity, a series of slides for controlling the supply of material to the several chute-compartments and thence to the corresponding compartments of the feed-wheels, and means for applying power to and governing the speed of the several feed-wheels, substantially as described.

In testimony whereof I have hereunto set my hand in presence of two subscribing witnesses.

EDWARD EVERETT HOLLISTER.

Witnesses:
SEYMOUR CARTER,
GEORGE W. PRESTON.